(12) United States Patent
Hang et al.

(10) Patent No.: US 11,251,700 B2
(45) Date of Patent: Feb. 15, 2022

(54) VOLTAGE REGULATION CIRCUIT OF SINGLE INDUCTOR AND MULTIPLE OUTPUTS AND CONTROL METHOD

(71) Applicant: Silergy Semiconductor Technology (Hangzhou) LTD, Hangzhou (CN)

(72) Inventors: Kailang Hang, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 137 days.

(21) Appl. No.: 16/426,126

(22) Filed: May 30, 2019

(65) Prior Publication Data
US 2019/0280594 A1    Sep. 12, 2019

Related U.S. Application Data

(63) Continuation of application No. 15/387,872, filed on Dec. 22, 2016, now Pat. No. 10,348,201.

(30) Foreign Application Priority Data

Dec. 31, 2015 (CN) .......................... 201511030698.2

(51) Int. Cl.
*H02M 3/02* (2006.01)
*H02M 1/38* (2007.01)
*H02M 3/158* (2006.01)
*H02M 1/00* (2006.01)

(52) U.S. Cl.
CPC ............... *H02M 3/02* (2013.01); *H02M 1/38* (2013.01); *H02M 3/158* (2013.01); *H02M 1/0003* (2021.05); *H02M 1/009* (2021.05)

(58) Field of Classification Search
CPC ... H02M 3/02; H02M 1/38; H02M 2001/0003
See application file for complete search history.

(56) References Cited

U.S. PATENT DOCUMENTS

| | | | |
|---|---|---|---|
| 5,617,015 A * | 4/1997 | Goder | ....................... G05F 1/56 323/282 |
| 6,437,545 B2 | 8/2002 | Sluijs | |
| 7,432,614 B2 * | 10/2008 | Ma | ........................ H02M 3/158 307/31 |
| 7,538,527 B2 | 5/2009 | O'Driscoll et al. | |
| 8,232,743 B2 | 7/2012 | Chen et al. | |
| 8,674,669 B2 | 3/2014 | Chen | |
| 8,749,213 B2 | 6/2014 | Chen | |
| 9,007,039 B2 * | 4/2015 | Kim | ....................... H02M 3/158 323/267 |

(Continued)

*Primary Examiner* — Adi Amrany

(57) ABSTRACT

A voltage regulation circuit can include: a power stage circuit with a single inductor and a plurality of output circuits; each output circuit having an output control switch configured to control a duration of an on time of the output circuit, and an output switch control circuit configured to control the output control switch in accordance with an output voltage sampling signal, a reference current signal that represents an output current of the output circuit, and a clock signal, in order to maintain an output voltage of the output circuit as constant and to decrease interference from load variations of any other of the plurality of output circuits; and where the output control switches are controlled to be on in sequence in each switching period.

12 Claims, 3 Drawing Sheets

(56) References Cited

U.S. PATENT DOCUMENTS

| | | | |
|---|---|---|---|
| 9,698,674 B1 | 7/2017 | Cherkassky et al. | |
| 10,164,534 B2 | 12/2018 | Hang et al. | |
| 2004/0201281 A1* | 10/2004 | Ma | H02M 3/158 |
| | | | 307/38 |
| 2005/0110471 A1 | 5/2005 | Mayega et al. | |
| 2005/0264271 A1 | 12/2005 | Lam et al. | |
| 2006/0198165 A1 | 9/2006 | O'Driscoll et al. | |
| 2008/0231115 A1 | 9/2008 | Cho et al. | |
| 2011/0187189 A1 | 8/2011 | Moussaoui et al. | |
| 2011/0254468 A1 | 10/2011 | Chen et al. | |
| 2012/0274134 A1 | 11/2012 | Gasparini et al. | |
| 2012/0286576 A1 | 11/2012 | Jing et al. | |
| 2012/0326691 A1 | 12/2012 | Kuan et al. | |
| 2013/0229058 A1* | 9/2013 | Chen | H02J 1/00 |
| | | | 307/31 |
| 2016/0066378 A1 | 3/2016 | Wang et al. | |
| 2016/0124447 A1* | 5/2016 | Kobayashi | G05F 1/575 |
| | | | 323/280 |
| 2017/0194857 A1 | 7/2017 | Hang et al. | |

* cited by examiner

VOLTAGE REGULATION CIRCUIT OF SINGLE INDUCTOR AND MULTIPLE OUTPUTS AND CONTROL METHOD

RELATED APPLICATIONS

This application is a continuation of the following application, U.S. patent application Ser. No. 15/387,872, filed on Dec. 22, 2016, and which is hereby incorporated by reference as if it is set forth in full in this specification, and which also claims the benefit of Chinese Patent Application No. 201511030698.2, filed on Dec. 31, 2015, which is incorporated herein by reference in its entirety.

FIELD OF THE INVENTION

The present invention generally relates to the field of the power electronics, and more particularly to single inductor multi-output voltage regulation circuits and associated control methods.

BACKGROUND

In a power management integrated circuit, a plurality of output voltages are typically used in order to supply power to corresponding modules. For example, both the central processing unit (CPU) and display screen may be powered in a cellphone, and different modules can have different supply voltage requirements. Therefore, multiple converter outputs can be used to satisfy the application requirements. That is, multiple voltage conversion circuits may be used to satisfy such requirements since one voltage conversion circuit typically only has one output.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In applications of multiple outputs, in order to reduce circuit complexity, a voltage regulation circuit with a structure of a single inductor and multiple outputs can be employed. In this case, the multiple outputs may share a common inductor, and in each switching period, the energy stored in the inductor may be distributed to the multiple outputs, in order to maintain the output voltages of the multiple outputs as substantially constant.

Figure 1:
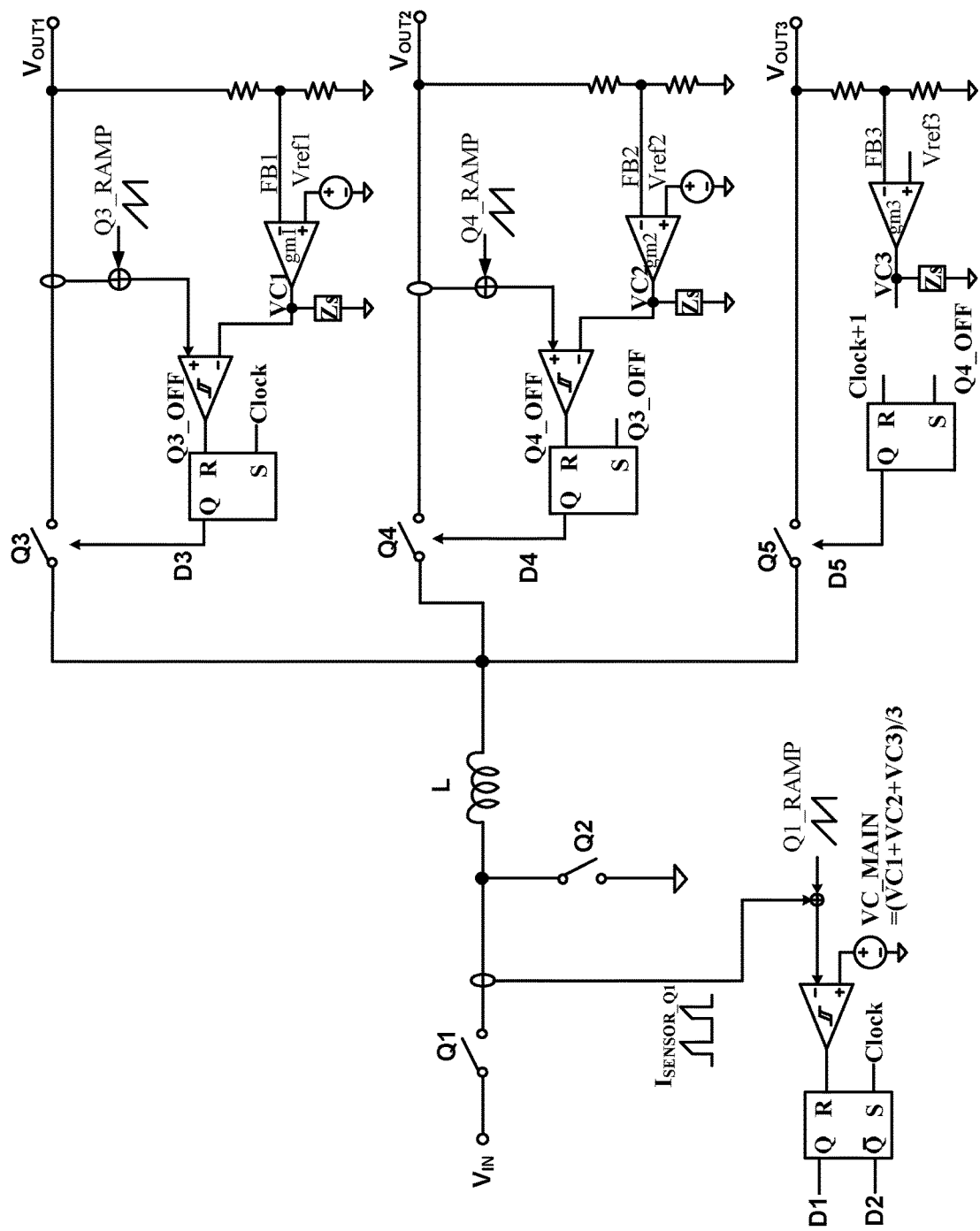
FIG. 1 is a schematic block diagram of an example voltage regulation circuit with a single inductor and multiple outputs.

Referring now to FIG. 1, shown is a schematic block diagram of an example voltage regulation circuit with a single inductor and multiple outputs. In this example, the voltage regulation circuit having a single inductor and multiple outputs can be implemented as a buck type converter circuit. Switching transistors Q1 and Q2 are the controlled switches of the buck type circuit that may utilize a constant frequency and peak current mode control. In each switching period, switching transistor Q1 can be triggered to be turned on by clock signal "Clock" having a constant frequency. When the sum of peak current sampling signal ISENSE_Q1 of switching transistor Q1 and slope signal Q1_RAMP reaches a level of reference signal VC_MAIN, switching transistor Q1 may be turned off, and switching transistor Q2 can be turned on. For example, reference signal VC_MAIN can be the sum of three output voltage feedback compensation signals: VC1, VC2, and VC3. Switching transistors Q3, Q4 and Q5 can control the energy transferred to the output terminals by inductor L.

Switching transistor Q3 can be controlled to initially be turned on, and when the sum of peak current sampling signal ISENSE_Q3 of switching transistor Q3 and slope signal Q3_RAMP reaches a level of feedback compensation signal VC1, switching transistor Q3 can be turned off. Then, switching transistor Q4 can be turned on. Similarly, when the sum of peak current sampling signal ISENSE_Q4 of switching transistor Q4 and slope signal Q4_RAMP reaches a level of feedback compensation signal VC2, switching transistor Q4 can be turned off, and switching transistor Q5 can be turned on, and may remain on until the end of the current switching period.

The peak current of switching transistors Q3 and Q4 can be sampled to determine the off operation of switching transistors Q3 and Q4 through comparators. When switching transistor Q1 is turned off and switching transistor Q2 is turned on, the currents of switching transistors Q3 and Q4 may be gradually decreased. Therefore, if the currents of switching transistors Q3 and Q4 do not reach appropriate levels in order to turn off switching transistors Q3 and Q4 and then begin to decrease, comparators may not be "flipped" or transitioned (e.g., from high to low, or vice versa). To solve this problem, slope signals can be added to the sampling current signals in order to compensate for the occurrence of a negative slope.

In some applications, due to the limit of the bandwidth of the main loop of the power stage, the duty cycles of switching transistors Q1 and Q2 may not change. Therefore, the energy stored in the inductor can be substantially constant in a switching period. In the example of FIG. 1, the sum of the energy of three output signals $V_{OUT1}$, $V_{OUT2}$, and $V_{OUT3}$ may be constant in one switching period prior to the main loop of the buck type circuit operating again. When one load changes, the remaining two loads can correspondingly change, which may induce a "jump" or transitory change and/or variation of output voltages, as well as the problem of mutual interference.

In one embodiment, a voltage regulation circuit can include: (i) a power stage circuit with a single inductor and a plurality of output circuits; (ii) each output circuit having an output control switch configured to control a duration of an on time of the output circuit, and an output switch control circuit configured to control the output control switch in accordance with an output voltage sampling signal, a reference current signal that represents an output current of the output circuit, and a clock signal, in order to maintain an output voltage of the output circuit as constant and to decrease interference from load variations of any other of the plurality of output circuits; and (iii) where the output control switches are controlled to be on in sequence in each switching period.

Figure 2:
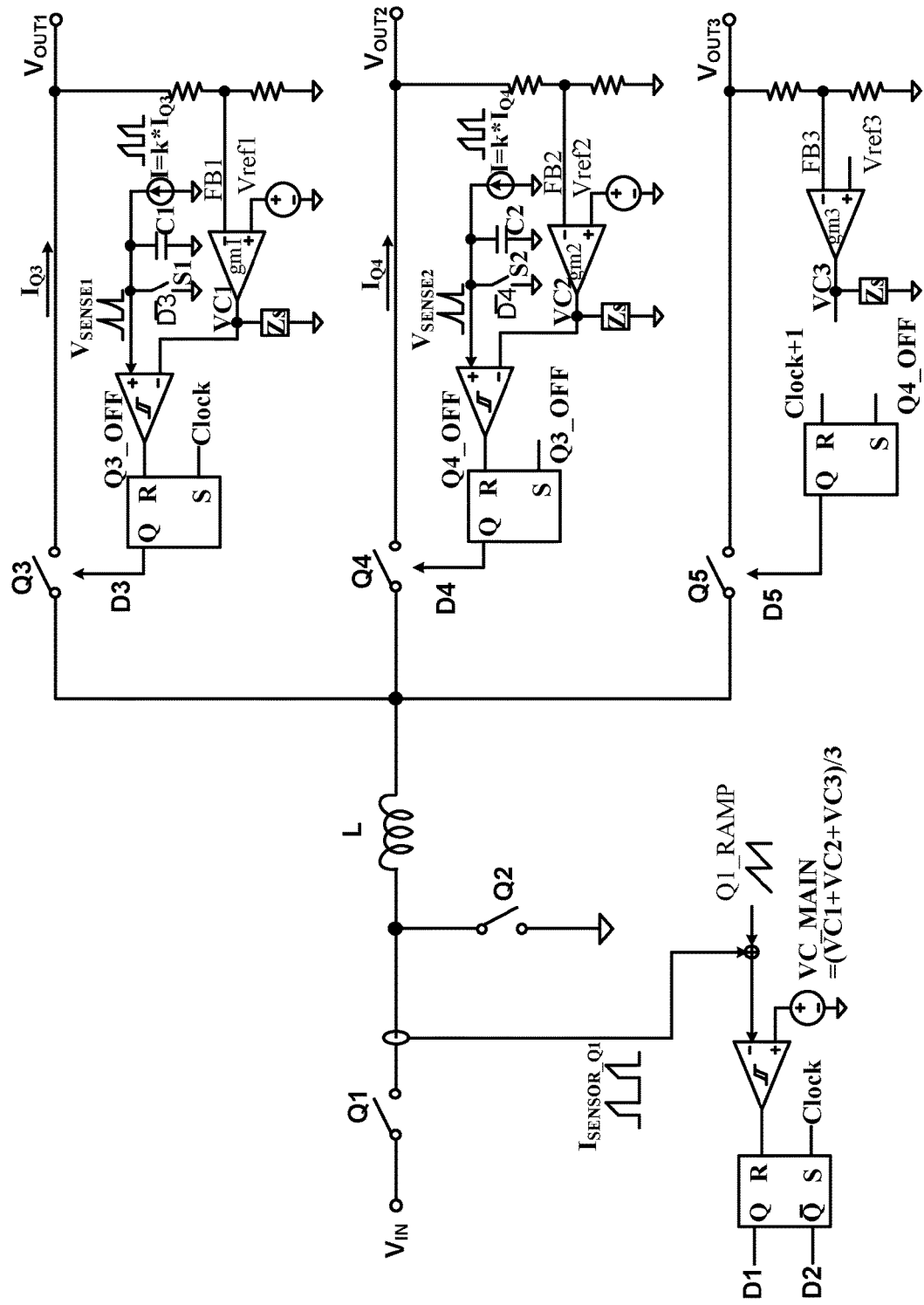
FIG. 2 is a schematic block diagram of an example voltage regulation circuit with a single inductor and multiple outputs, in accordance with embodiments of the present invention.

Referring now to FIG. 2, shown is a schematic block diagram of an example voltage regulation circuit with a single inductor and multiple outputs, in accordance with embodiments of the present invention. This particular example voltage regulation circuit can include a power stage circuit configured as a buck topology with one single inductor and multiple output terminals. Other topologies (e.g., boost type, buck-boost type, etc.) can also be applied in certain embodiments.

This example power stage circuit with only a single inductor (i.e., no other inductors in the power stage circuit) can include switching transistor Q1, switching transistor Q2, and inductor L. For example, switching transistor Q1 and inductor L can be coupled in series between input voltage $V_{IN}$ and ground. A first terminal of inductor L can connect to a common node between switching transistor Q1 and inductor L, and a second terminal of inductor L can be coupled to multiple output circuits. In this example, there are three output circuits, each of which including a corresponding output control switch to control the duration of the on time of the corresponding output circuit. Output voltages $V_{OUT1}$, $V_{OUT2}$, and $V_{OUT3}$ of the three output circuits can be correspondingly controlled by output control switches Q3, Q4 and Q5. In addition, each output circuit can include an output switch control circuit to control the on and off operation of the output control switch. Further, this example voltage regulation circuit may be operated in a constant frequency control mode.

The first output circuit can include an output voltage feedback compensation circuit and an output current integration circuit. The on operation of output control switch Q3 can be controlled by clock signal "Clock." At the beginning of each switching period, output control switch Q3 may be triggered to be on by clock signal "Clock." Output voltage VOUT1 can be sampled by the output voltage feedback compensation circuit, in order to generate output voltage sampling signal FB1. The error between output voltage sampling signal FB1 and reference voltage signal Vref1 may be amplified by error amplifier "gm1" and compensated by compensation circuit Zs1 to generate feedback compensation signal VC1. The output current of output control switch Q3 can be sampled and configured as a current source k*IQ3 to charge capacitor C1 in order to generate reference current signal $V_{SENSE1}$ by the output current integration circuit. In this way, each output circuit may have increased independence, and no slope compensation may be needed.

When reference current signal $V_{SENSE1}$ reaches a level of feedback compensation signal VC1, off control signal Q3_OFF can be generated to turn off output control switch Q3. Output current integration circuit can include current source k*IQ3, capacitor C1, and discharging switch S1 coupled in parallel with each other. The on and off states of discharging switch S1 may be complementary with output control switch Q3. When output control switch Q3 is on, discharging switch S1 may be off, and capacitor C1 can be charged by current source k*IQ3. When output control switch Q3 is off, discharging switch S1 may be on, and capacitor C1 can be discharged. In another implementation, during the off time of output control switch Q3, the on time of discharging switch S1 can be less than the off time of output control switch Q3.

For the second output circuit, off control signal Q3_OFF of the first output circuit can be configured as the on signal of output control switch Q4. Similarly, output current integration circuit can include current source k*IQ3, capacitor C2, and discharging switch C2 coupled in parallel with each other. The on and off states of discharging switch S2 may be complementary with output control switch Q3. When output control switch Q3 is on, discharging switch S1 may be off, and capacitor C1 can be charged by current source k*IQ3. When output control switch Q3 is off, discharging switch S1 can be on, and capacitor C1 may be discharged.

The output current of output control switch Q4 can be sampled and configured as a current source k*IQ4 to charge capacitor C2 in order to generate reference current signal $V_{SENSE2}$ by the output current integration circuit. Output voltage $V_{OUT2}$ may be sampled by the output voltage feedback compensation circuit in order to generate output voltage sampling signal FB2. The error between output voltage sampling signal FB2 and reference voltage signal Vref2 can be amplified by error amplifier "gm2" and compensated by compensation circuit Zs2 in order to generate feedback compensation signal VC2. When reference current signal $V_{SENSE2}$ reaches a level of feedback compensation signal VC2, off control signal Q4_OFF may be generated to turn off output control switch Q4.

In this implementation, the first and second output circuits are more independent, as compared to other approaches. Thus, the load variation of first output circuit may not influence the second output circuit. When the load of first output circuit changes, the second output circuit can maintain a substantially stable output voltage. However, in view that the total energy can be constant, the load variation may influence the third output circuit configured as a balancing circuit. For the third output circuit, off control signal Q4_OFF of the first output circuit may be configured as the on signal of output control switch Q5. The off operation can be controlled by clock signal "Clock". At the beginning of a next switching period of the clock signal, output control switch Q5 may be controlled to be off. The error between output voltage sampling signal FB3 and reference voltage signal Vref3 can be amplified by error amplifier gm3, and may be compensated by compensation circuit Zs3 in order to generate feedback compensation signal VC3.

To achieve control of the single inductor power stage circuit, feedback compensation signals of the three output circuits may be appropriately weighted: VC_MAIN= (k1*VC1+k2*VC2+k3*VC3)/3. The value of coefficients k1, k2 and k3 can be selected and predetermined. In this particular example, coefficients k1, k2 and k3 may all be selected to be 1. Inductor current IL during the on time of switching transistor Q1 can be sampled to generate current sampling signal $I_{SENSEOR\_Q1}$. Reset signal VR may be generated by comparing current sampling signal $I_{SENSEOR\_Q1}$ against reference signal VC_MAIN. The on and off states of switching transistors Q1 and Q2 can be controlled by reset signal VR and the clock signal.

The on and off states of switching transistors Q1 and Q2 may be complementary. At the beginning of each of switching period of the clock signal, switching transistor Q1 can be turned on, while switching transistor Q2 may be off. When current sampling signal $I_{SENSEOR\_Q1}$ reaches reference signal VC_MAIN, switching transistor Q1 can be turned off, and switching transistor Q2 may be turned off by reset signal VR. In addition, to improve stability, slope signal Q1_RAMP can be added to current sampling signal $I_{SENSEOR\_Q1}$.

In one embodiment, a control method for a voltage regulation circuit with a single inductor and multiple outputs, can include: (i) controlling a duty cycle of switching transistors of a power stage circuit to control a sum of energy transferred to a plurality of output circuits; (ii) controlling the plurality of output circuits to be on in sequence in each switching period; and (iii) controlling a duration of an on time of each of the output circuits to receive energy from the power stage circuit in accordance with an output voltage sampling signal, a reference current signal that represents an output current of the output circuit and a clock signal, in order to maintain an output voltage of the output circuit as constant and to decrease interference from load variations of any other of the plurality of output circuits.

Figure 3:
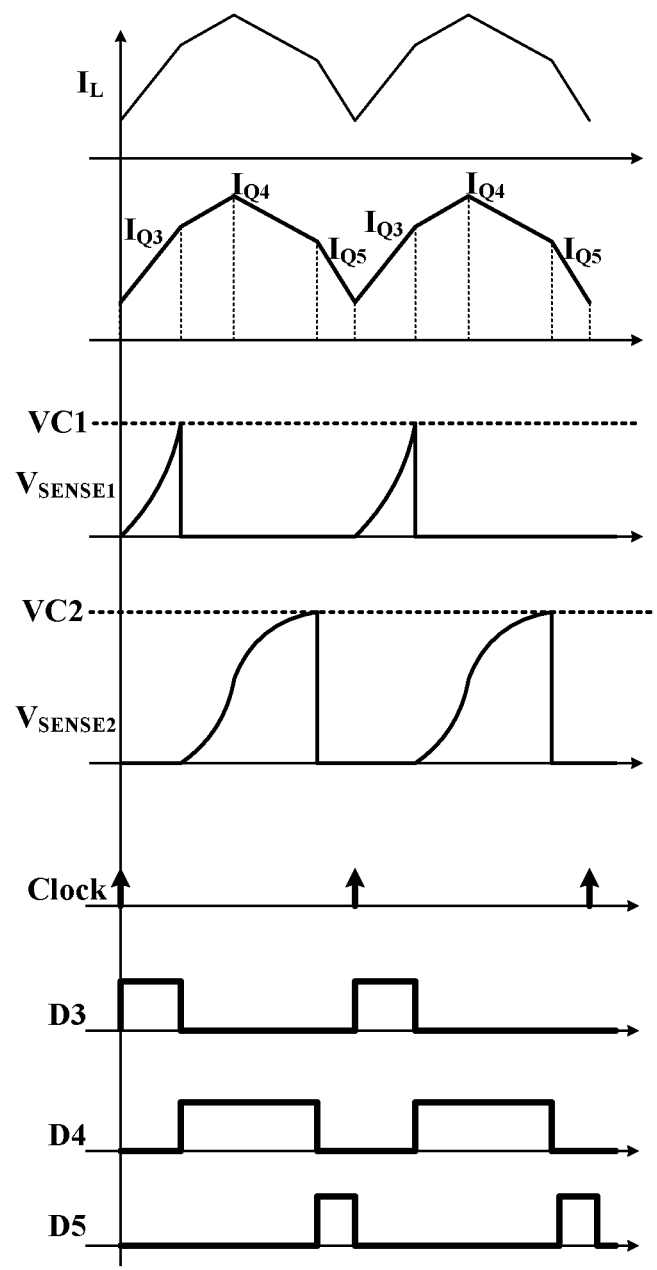
FIG. 3 is a waveform diagram of example operation of a voltage regulation circuit with a single inductor and multiple outputs, in accordance with embodiments of the present invention.

Referring now to FIG. 3, shown is a waveform diagram of example operation of a voltage regulation circuit with a single inductor and multiple outputs, in accordance with embodiments of the present invention. In this example, the reference current signals of the first and second output circuits may be generated by integrating the current of control switches Q3 and Q4, but not by directly sampling current of control switches Q3 and Q4. In this way, regardless of whether the slope of the current of control switches Q3 and Q4 is positive or negative, the slope of reference current signals generated by integrating the current of control switches Q3 and Q4 can be always be positive in order to eliminate the use of slope signals, which can simplify the circuitry. Also, reference current signals generated by integrating current of control switches Q3 and Q4 may also solve problems of mutual interference. For the first output circuit, the output current may be the average value of current through output control switch Q3, as shown below in Equation (1).

$$I_{OUT1} = \int_0^{T \cdot D1} I_{Q3} \cdot dt \quad (1)$$

When reference current signal $V_{SENSE1}$ reaches a level of feedback compensation signal VC1, as shown below in Equation (2).

$$VC1 = \int_0^{T \cdot D1} k * I_{Q3} \cdot dt = k * I_{OUT1} \quad (2)$$

From the above two formulas, there may be only one variable $I_{OUT1}$ in the function of VC1. When output current $I_{OUT1}$ is constant, feedback compensation signal VC1 may not vary with the inductor current, and the variation of the load of the other two output circuits may be maintained as substantially constant. Therefore, output voltage $V_{OUT1}$ may not be influenced by the other two output circuits. In addition, for the second output circuit, output current $I_{OUT2}$ and feedback compensation signal VC2 may have a similar relationship. Therefore, output voltage $V_{OUT2}$ may not be influenced by the other two output circuits.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A voltage regulation circuit, comprising:
    a) a power stage circuit with a single inductor and N output circuits, wherein N is a positive integer that is greater than or equal to three;
    b) each said output circuit comprising an output control switch configured to control a duration of an on time of said output circuit, and an output switch control circuit configured to control said output control switch, wherein an off operation of the first to the (N−1)th output control switch is controlled by using an output voltage and an output current of said output circuit, in order to maintain an output voltage of said output circuit to be constant, wherein said output current of said output circuit is sampled and integrated independently of output currents of any other of said N output circuits for generating a reference current signal that is compared against a feedback compensation signal that is derived from said output voltage, in order to control said off operation; and
    c) wherein said output control switches are controlled to be on in sequence in each switching period, whereby an off control signal of the previous output control switch is configured to trigger an on signal of the next output control switch.

2. The voltage regulation circuit of claim 1, wherein an on operation of the first output control switch is controlled by a clock signal, and an operation of the second to the Nth output circuit is controlled in accordance with the off control signal of the previous output control switch.

3. The voltage regulation circuit of claim 1, wherein the off operation of the Nth output control switch is controlled by a clock signal, and the off operation of the first to the (N−1)th output control switch is controlled by the comparison between the reference current signal and the feedback compensation signal representing an error between the output voltage and an expected output voltage.

4. The voltage regulation circuit of claim 3, further comprising an off signal generation circuit, comprising:
    a) an output voltage feedback compensation circuit configured to generate the feedback compensation signal by compensating an error between a reference voltage signal and an output voltage sampling signal representing said output voltage;
    b) an output current integration circuit configured to generate said reference current signal by integrating a sampling signal that represents said output current; and
    c) a comparison circuit configured to compare said reference current signal against said feedback compensation signal to generate said off control signal.

5. The voltage regulation circuit of claim 4, wherein said output current integration circuit comprises:
    a) a discharging switch controlled to be off in the on time interval of said output control switch, and to be on in the off time interval of said output control switch;
    b) a capacitor; and
    c) a current source that represents said output current, wherein said discharging switch, said capacitor and said current source are coupled in parallel with each other, wherein said capacitor is charged by said current source in the on time interval of said output control switch, and said capacitor is discharged during at least a portion of the off time interval of said output control switch.

6. The voltage regulation circuit of claim 4, wherein output voltage feedback compensation circuit comprises:
    a) a sampling circuit configured to sample said output voltage to generate a voltage sampling signal;

b) an error amplifier configured to calculate and amplify an error between said voltage sampling signal and a reference voltage signal; and
c) a compensation circuit coupled to an output of said error amplifier, and being configured to compensate an output signal of said error amplifier to generate said feedback compensation signal.

7. The voltage regulation circuit of claim 1, wherein:
a) feedback compensation signals of said output circuits representing an error between the output voltage and an expected output voltage are weighted averaged to generate a reference signal;
b) said reference signal is compared against a current sampling signal representing an inductor current to generate a reset signal by a flip-flop; and
c) said power stage circuit comprises first and second switching transistors coupled to said single inductor, and on and off operations of said first and second switching transistors are controlled by said reset signal and said clock signal.

8. A control method for a voltage regulation circuit with a single inductor and multiple outputs, the method comprising:
a) controlling a duty cycle of switching transistors of a power stage circuit to control energy transferred to N output circuits, wherein N is a positive integer that is greater than or equal to three;
b) controlling an on operation of the first output circuit in accordance with a clock signal;
c) controlling an on operation of the second to the Nth output circuits in accordance with an off operation of the previous output circuit; and
d) controlling a duration of an on time of the first output circuit to the (N−1)th output circuit to receive energy from said power stage circuit by using an output voltage sampling signal, and a reference current signal that represents an output current of said output circuit, and controlling a duration of an on time of said Nth output circuit in accordance with a clock signal, in order to maintain an output voltage of said output circuit to be constant, wherein said reference current signal is generated by sampling and integrating said output current of said output circuit independently of output currents of any other of said N output circuits and is compared against a feedback compensation signal that is derived from said output voltage in order to control said off operation.

9. The method of claim 8, wherein said reference current signal is generated by integrating a sampling signal representing said output current.

10. The method of claim 9, wherein on and off operation of each of said output circuits is controlled by an output control switch coupled between said power stage circuit and said output circuit.

11. The method of claim 10, further comprising:
a) generating said feedback compensation signal representing an error between a reference voltage signal and said output voltage sampling signal; and
b) comparing said feedback compensation signal against said reference current signal to generate an off control signal to control an off operation of said output control switch.

12. The method of claim 8, further comprising:
a) generating a reference signal by calculating a weighted value of a sum of a feedback compensation signal of each output circuit representing an error between said output voltage and an expected output voltage;
b) generating a reset signal by comparing said reference signal against a current sampling signal representing an inductor current of said power stage circuit; and
c) controlling on and off states of switching transistors of said power stage circuit in accordance with said reset signal and said clock signal.

* * * * *